United States Patent
Nayak

(10) Patent No.: US 11,477,717 B2
(45) Date of Patent: Oct. 18, 2022

(54) PROVIDING SIGNAL QUALITY INFORMATION FOR A NON-PRIMARY BASE STATION

(71) Applicant: Google LLC, Mountain View, CA (US)

(72) Inventor: Shivank Nayak, Mountain View, CA (US)

(73) Assignee: Google LLC, Mountain View, CA (US)

( * ) Notice: Subject to any disclaimer, the term of this patent is extended or adjusted under 35 U.S.C. 154(b) by 677 days.

(21) Appl. No.: 16/474,605

(22) PCT Filed: Jun. 29, 2018

(86) PCT No.: PCT/US2018/040243
§ 371 (c)(1),
(2) Date: Jun. 28, 2019

(87) PCT Pub. No.: WO2020/005271
PCT Pub. Date: Jan. 2, 2020

(65) Prior Publication Data
US 2021/0266812 A1    Aug. 26, 2021

(51) Int. Cl.
*H04W 4/00* (2018.01)
*H04W 36/36* (2009.01)
(Continued)

(52) U.S. Cl.
CPC ..... *H04W 36/365* (2013.01); *H04M 1/72469* (2021.01); *H04W 36/0085* (2018.08);
(Continued)

(58) Field of Classification Search
None
See application file for complete search history.

(56) References Cited

U.S. PATENT DOCUMENTS

| 2004/0142699 A1 | 7/2004 | Jollota et al. |
| 2013/0130693 A1 | 5/2013 | Salvador et al. |

(Continued)

FOREIGN PATENT DOCUMENTS

| EP | 1596564 | 11/2005 |
| WO | WO 2013/093555 | 6/2013 |
| WO | WO 2016/061746 | 4/2016 |

OTHER PUBLICATIONS forums.androidcentral.com [online] "[Free][App]Checking mobile (GSM/UMTS/LTE) signals" May 2017, [retrieved May 2018], retrieved from: URL <https://forums.androidcentral.com/android-apps/763148-free-app-checking-mobile-gsm-umts-lte-signals.html >, 5 pages.

PCT International Search Report and Written Opinion in International Appln. No. PCT/US2018/040243, dated Jan. 2, 2019, 22 pages.

(Continued)

*Primary Examiner* — Suhail Khan
(74) *Attorney, Agent, or Firm* — McDonnell Boehnen Hulbert & Berghoff LLP

(57) ABSTRACT

The subject matter described in this disclosure can be embodied in methods and systems for providing signal quality information for a non-primary base station. A computing device identifies a first quality of wireless communication between a first base station and the computing device. The computing device identifies, while remaining in communication with the first base station, a second quality of wireless communication between a second base station and the computing device. The computing device determines that the second quality of wireless communication is better than the first quality of wireless communication. The computing device continues to communicate with the first base station after having determined that the second quality of wireless communication is better than the first quality of wireless communication. The computing device provides, while continuing to communicate with the first base station, (Continued)

an indication that wireless communication with the computing device has the second quality of wireless communication.

18 Claims, 9 Drawing Sheets

(51) Int. Cl.
```
      H04W 36/00      (2009.01)
      H04M 1/72469    (2021.01)
      H04W 36/30      (2009.01)
      H04W 48/06      (2009.01)
      H04W 88/02      (2009.01)
```
(52) U.S. Cl.
CPC ..... *H04W 36/00837* (2018.08); *H04W 36/30* (2013.01); *H04W 48/06* (2013.01); *H04W 88/02* (2013.01)

(56) References Cited

U.S. PATENT DOCUMENTS

| | | |
|---|---|---|
| 2015/0018040 A1 | 1/2015 | He et al. |
| 2016/0029204 A1* | 1/2016 | Lalwaney ............. H04W 8/205 455/418 |
| 2016/0360462 A1 | 12/2016 | Chockalingam et al. |
| 2017/0367064 A1 | 12/2017 | Lu et al. |

OTHER PUBLICATIONS redmondpie.com [online], "Signal app for iPhone shows detailed info of cellular towers around you" Aug. 2010, [retrieved May 31, 2018], retrieved from: URL <http://www.redmondpie.com/signal-app-for-iphone-shows--detailed-inf0--0f-cellular-towers--around-you/ >, 3 pages.

signalmonitoring.com [online], "Description of Cell Signal Monitor," Jun. 2017, retrieved on Dec. 27, 2019, retrieved from URL <https://signalmonitoring.com/en/cell-signal-monitor-description>, 8 pages.

* cited by examiner

Continue to wirelessly communicate with the first base station 120
after having determined that the second quality of wireless communication
is better than the first quality of wireless communication

122
Respond to network management instructions

124
Implement hysteresis

126
Send communications exclusively through the first base station

Send communications at least partially through the second base station
128

130
Receive control signals from the first base station

132
Communicate with multiple base stations
according to a carrier aggregation mechanism

134
Communicate with the second base station
using a higher frequency and/or power
than with the first base station

Provide, while the computing device continues to wirelessly communicate with the first base station, an indication that wireless communication with the computing device has the second quality of wireless communication    140

Present an indication that wireless communication has the second quality    142

Present the indication in a status bar    144

Present the indication as an only presented indication of a quality of wireless communication with the computing device    146

Present the indication of the second quality along with an indication of the first quality    148

Provide the indication to a third party application    150

Provide the indication of the second quality without providing the indication of the first quality    152

Select, by the third party application, content at a quality level higher than the first quality    154

Monitor signal quality of base stations at various frequencies — 160

Increase a monitoring frequency of the second base station — 162

Monitor higher-quality base stations
more frequently than lower-quality base stations — 164

Identify a third quality of wireless communication
between a third base station and the computing device — 166

Determine that the third quality is worse than the first quality — 168

Monitor a quality of wireless communication
with the first base station at a first frequency — 170

Monitor a quality of wireless communication
with the third base station at a lesser frequency — 172

Monitor a quality of wireless communication with the
second base station at a frequency higher than the lesser frequency — 174

FIG. 1D

PROVIDING SIGNAL QUALITY INFORMATION FOR A NON-PRIMARY BASE STATION

CROSS-REFERENCE TO RELATED APPLICATION

This application is a National Stage Application under 35 U.S.C. § 371 and claims the benefit of International Application No. PCT/US2018/040243, filed on Jun. 29, 2018. The disclosure of the prior application is considered part of and is incorporated by reference in the disclosure of this application.

TECHNICAL FIELD

This document generally relates to cellular communications.

BACKGROUND

Many computing devices are equipped with hardware that enables the computing devices to wirelessly communicate with other computing systems. Sometimes such wireless communications are with a collection of geographically dispersed base stations installed by a network provider. A computing device may "hand off" from communicating with a first base station to communicating with a second base station when the computing device moves from a geographical region served by the first base station to a geographical region served by the second base station, for example, if the computing device were in a vehicle driving down a road from the first geographical region to the second geographical region.

SUMMARY

This document describes techniques, methods, systems, and other mechanisms for cellular communications. In general, a computing device may continue to wirelessly communicate with a first base station even though the computing device may receive signals that are of higher quality from a second base station, for example, because a network provider designated that the first computing device is to remain connected to the first base station due to congestion at the second base station. Still, the first base station may provide sufficient throughput for voice and data communications requested by the computing device, and should the computing device need further throughput, the network provider may transition the computing device to the second base station to ensure communication requests are satisfactorily fulfilled.

In such circumstances, it may be undesirable to provide information indicating that the computing device is wirelessly communicating with a quality metric provided by the first base station. For example, a video streaming service may transmit video content at a lower resolution than it otherwise would if the computing device indicated that it was communicating with a base station that communicated at the lower quality level rather than a higher quality level, even if the lower quality level is sufficient to transmit video content at the higher resolution. To ensure that the network provides a satisfactory user experience and operates with high levels of efficiency, the computing device can indicate to application programs that it is wirelessly communicating with the higher signal quality.

Similarly, the computing device may graphically indicate on a display of the computing device that its wireless connection has the higher quality level, for example, using a signal quality icon in the status bar. In such circumstances, the computing device may not only display a graphical indication of a quality of communications with a second base station instead of the first base station, but the computing device may also monitor the signal quality of the second base station more frequently than it otherwise would have, had the second base station communicated at a quality level lower than that of the first base station (but less frequently than is needed for neighbor cell reporting to the network).

Particular implementations can, in certain instances, realize one or more of the following advantages. Applications may determine to communicate media content with a quality or speed that represents current capabilities of the wireless communication network to which the computing device is connected rather than a specific base station to which the computing device is momentarily connected. Similarly, users may receive information that portrays capabilities of the wireless communication network at a particular location rather than a single base station to which the device is momentarily connected at the particular location.

In situations in which the computing device is employing a carrier aggregation mechanism to communicate with multiple base stations at substantially the same time, the computing device may present information that reflects the quality of the wireless connection between the computing device and a secondary base station that is handling a majority of the data transfer, even though the computing device is receiving control signals from a different, primary base station.

Further, the computing device may automatically increase the frequency with which it monitors the strength of communications from a base station upon the computing device determining that communications with that base station are of a higher quality than those of a main base station with which the computing device is communicating. As such, the computing device may generate more regular updates regarding a quality of communications with a second base station than with other base stations in the geographical area. Electing to more frequently monitor a second base station can allow the computing device to more quickly and accurately identify a quality of the wireless communication network at a given geographical location, independent of a quality of communications provided by a base station which with the computing device is currently connected, and independent of a monitoring for identifying neighboring cell signal strengths for reporting to the network.

As additional description to the embodiments described below, the present disclosure describes the following embodiments.

Embodiment 1 is a computer-implemented signal quality providing method. The method comprises identifying, by a computing device, a first quality of wireless communication between a first base station and the computing device based on wireless signals that the computing device received from the first base station. The method comprises identifying, by the computing device while the computing device remains in wireless communication with the first base station, a second quality of wireless communication between a second base station and the computing device based on wireless signals that the computing device received from the second base station. The method comprises determining, by the computing device, that the second quality of wireless communication between the second base station and the computing device is better than the first quality of wireless communication between the first base station and the computing device. The method comprises continuing, by the computing device, to wirelessly communicate with the first base station after having determined that the second quality of wireless communication is better than the first quality of wireless communication, as a result of one or more instructions received by the computing device from the first base station. The method comprises providing, by the computing device while the computing device continues to wirelessly communicate with the first base station, an indication that wireless communication with the computing device has the second quality of wireless communication.

Embodiment 2 is the computer-implemented signal quality providing method of embodiment 1, wherein providing the indication that wireless communication with the computing device has the second quality includes presenting, by a display of the computing device, an indication that wireless communication with the computing device has the second quality.

Embodiment 3 is the computer-implemented signal quality providing method of embodiment 1, wherein providing the indication that wireless communication with the computing device has the second quality includes presenting, in a status bar of a display of the computing device, a displayed indication that wireless communication with the computing device has the second quality.

Embodiment 4 is the computer-implemented signal quality providing method of embodiment 3, wherein the displayed indication in the status bar that wireless communication with the computing device has the second quality comprises a presentation of a second number of bars representing signal strength. Moreover, the first quality of wireless communication corresponds to a presentation of a first number of bars representing signal strength that is different from and less than the second number of bars.

Embodiment 5 is the computer-implemented signal quality providing method of embodiment 4, wherein the displayed indication in the status bar that wireless communication with the computing device has the second quality comprises the presentation of the second number of bars along with a presentation of the first number of bars to indicate that wireless communication with the computing device has the first quality in addition to the second quality. Moreover, the presentation of the second number of bars is graphically different from the presentation of the first number of bars.

Embodiment 6 is the computer-implemented signal quality providing method of embodiment 4, wherein the presentation of the first number of bars comprises a presentation of a first contiguous portion a graphical object. Moreover, the presentation of the second number of bars comprises a presentation of a second contiguous portion of the graphical object that includes the first contiguous portion and an additional portion of the graphical object.

Embodiment 7 is the computer-implemented signal quality providing method of embodiment 4, wherein the displayed indication in the status bar that wireless communication with the computing device has the second quality is an only indication presented by the display of the computing device of a quality of wireless communication with the computing device.

Embodiment 8 is the computer-implemented signal quality providing method of any one of embodiments 1 through 7, wherein providing the indication that wireless communication with the computing device has the second quality includes providing, to a third-party application program that is executing on the computing device that was downloaded from an online application marketplace independent of an operating system installation or upgrade, the indication that wireless communication with the computing device has the second quality while the computing device continues to wirelessly communicate with the first base station.

Embodiment 9 is the computer-implemented signal quality providing method of embodiment 8, wherein the computing device provides, to the third-party application program, the indication that wireless communication with the computing device has the second quality, without providing any indication to the third-party application program that wireless communication with the computing device has the first quality.

Embodiment 10 is the computer-implemented signal quality providing method of embodiment 8, wherein the third-party application program selects to receive media content at a second quality level that is higher than a first quality level in response to the third-party application program having received the indication that wireless communication by the computing device has the second quality. Moreover, the third-party application program is configured to select to receive the media content at the first quality level in response to the third-party application program receiving an indication that wireless communication by the computing device has the first quality.

Embodiment 11 is the computer-implemented signal quality providing method of any one of embodiments 1 through 10, wherein continuing to wirelessly communicate with the first base station after having determined that the second quality of wireless communication is better than the first quality of wireless communication includes the computing device sending communications to remote computing systems over the Internet exclusively through the first base station without sending communications to remote computing systems over the Internet through the second base station.

Embodiment 12 is the computer-implemented signal quality providing method of any one of embodiments 1 through 10, wherein continuing to wirelessly communicate with the first base station after having determined that the second quality of wireless communication is better than the first quality of wireless communication includes the computing device sending communications to remote computing systems over the Internet at least partially through the second base station while receiving control signals from the first base station.

Embodiment 13 is the computer-implemented signal quality providing method of embodiment 12, wherein the computing device communicates with multiple base stations during a same time period according to a carrier aggregation mechanism. Moreover, the first base station comprises a primary cell of the carrier aggregation mechanism and the second base station comprises a secondary cell of the carrier aggregation mechanism.

Embodiment 14 is the computer-implemented signal quality providing method of embodiment 12, wherein (i) the computing device communicates with the second base station over a second frequency range that is higher than a first frequency range; (ii) the computing device communicates with the first base station over the first frequency range; (iii) signals transmitted by the second base station for receipt by the computing device are transmitted with a second power level that is lower than a first power level; and (iv) signals transmitted by the first base station for receipt by the computing device are transmitted with the first power level.

Embodiment 15 is the computer-implemented signal quality providing method of embodiment 12. The method comprises: (i) sending, by the computing device and to the first base station, a list of multiple base stations from which the computing device receives wireless signals, the list of multiple base stations identifying the second base station; (ii) receiving, by the computing device and from the first base station in response to the computing device having sent the list of multiple base stations to the first base station, one or more instructions to wirelessly connect the computing device to the second base station while the computing device remains connected to the first base station; and (iii) establishing, by the computing device, wireless communication with the second base station in response to the computing device having received the one or more instructions from the first base station.

Embodiment 16 is the computer-implemented signal quality providing method of embodiment 15. The method comprises: (i) receiving, by the computing device, paging signals exclusively from the first base station and not from the second base station while the computing device concurrently communicates with the first base station and the second base station; and (ii) receiving, by the computing device and from the second base station while the computing device concurrently communicates with the first base station and the second base station, media content transmitted over the Internet.

Embodiment 17 is the computer-implemented signal quality providing method of embodiment 1. The method comprises designating, by the computing device and based on the computing device having determined that the second quality of wireless communication is better than the first quality of wireless communication, the second base station as a base station for which to monitor signal quality more frequently than other base stations that are not so designated.

Embodiment 18 is the computer-implemented signal quality providing method of embodiment 1. The method comprises: (i) identifying, by the computing device while the computing device continues to wirelessly communicate with the first base station, a third quality of wireless communication between a third base station and the computing device based on wireless signals that the computing device received from the third base station; (ii) determining, by the computing device, that the third quality of wireless communication is worse than the first quality of wireless communication between the first base station and the computing device; (iii) monitoring, by the computing device, a quality of wireless communications between the first base station and the computing device at a first frequency; (iv) monitoring, by the computing device, a quality of wireless communications between the third base station and the computing device at a third frequency that is less than the first frequency, as a result of the computing device having determined that the third quality of wireless communication is worse than the first quality of wireless communication; and (v) monitoring, by the computing device, a quality of wireless communications between the second base station and the computing device at a second frequency that is greater than the third frequency, as a result of the computing device having determined that the second quality of wireless communication is better than the first quality of wireless communication.

Embodiment 19 is the computer-implemented signal quality providing method of embodiment 18, wherein the second frequency is same as the first frequency.

Embodiment 20 is directed to a system that includes one or more processors and one or more computer-readable devices having instructions stored thereon, that when executed by the one or more processors, cause the performance of actions according to the method of any one of embodiments 1 through 19.

Embodiment 21 is directed to one or more computer-readable devices having instructions stored thereon, that when executed by one or more processors, cause the performance of actions according to the method of any one of embodiments 1 through 19.

The details of one or more implementations are set forth in the accompanying drawings and the description below. Other features, objects, and advantages will be apparent from the description and drawings, and from the claims.

DESCRIPTION OF DRAWINGS

FIGS. 1A-D show a flowchart of a process for providing signal quality information for a non-primary base station.

Like reference symbols in the various drawings indicate like elements.

DETAILED DESCRIPTION

Figure 1A:
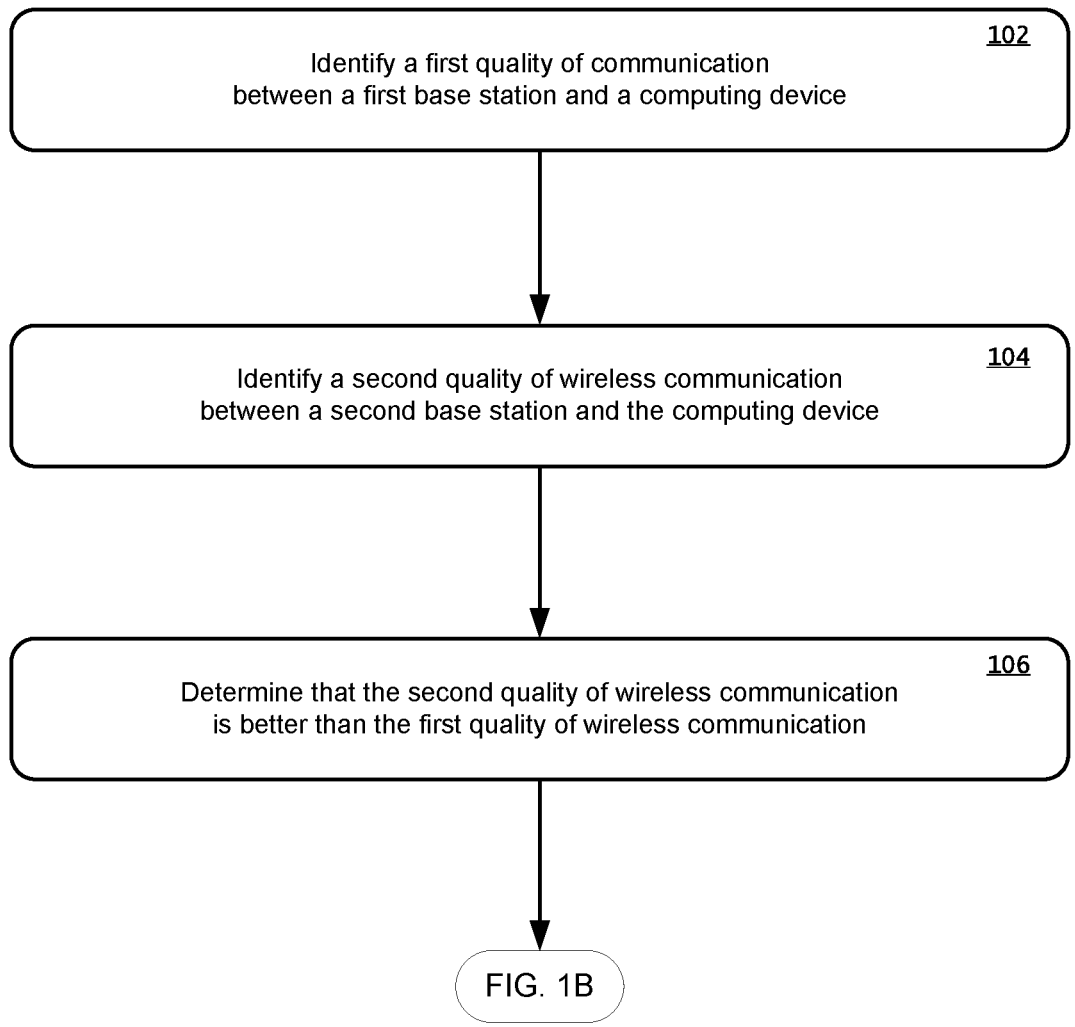

This document generally relates to cellular communications. Many mobile computing devices, such as cell phones, laptops, and internet-of-things devices communicate with cellular networks that include geographically dispersed cell towers with which the devices can communicate, depending on their location. Oftentimes a computing device will connect to a base station from which the computing device receives a highest-quality signal, for example, the strongest signal, the signal that provides the fewest packet or bit transmission errors, or some combination of these or other metrics.

Sometimes a computing device connects to a base station that does not provide the highest-quality signal from among a collection of base stations with which the computing device is able to connect. There are various reasons that a computing device may connect to a base station that provides a lower quality signal, but network management and hysteresis avoidance are two main reasons.

Regarding network management, a computing system administered by the network provider may monitor base stations and may determine that a particular base station is experiencing overuse and that at least some wireless devices should connect to other nearby base stations, even if those other base stations offer lower quality connections. Accordingly, the network provider may instruct a computing device to either switch away from an overused base station or to remain connected to a base station that does not provide a highest-quality communication signal. (In some examples, the instruction is sent before the base station is identified as providing a lower-quality signal than another base station, and the network provider simply avoids sending an instruction to switch to the other base station that is providing the higher-quality signals.)

Other network management reasons that a computing device may connect to a base station that does not provide a highest quality communication include the computing device or the network provider reserving a base station with the highest quality signal for certain types of communications (e.g., media communications) or certain devices (e.g., devices that are furthest away from the base station due to the base station operating with frequencies that are better suited for long-distance communications).

Another reason that a computing device may communicate with a first base station that does not provide a highest quality signal is to prevent the computing device from switching from base station to base station too frequently. For example, the computing device may have recently switched to the first base station from the second base station or another base station, and afterward determined that the second base station provided a higher-quality signal than the first base station (e.g., due to a quality of communications from the first base station suddenly declining). In such circumstances, the computing device may remain connected to the first base station for a certain amount of time to ensure that the computing device does not switch base stations too frequently. A device avoiding switching back and forth too commonly, for example, by implementing a timed delay after a switch has been made before another base station switch is permitted is sometimes called hysteresis, and can increase network stability by preventing unnecessary movement of devices from cell-to-cell within the cellular network.

Still, it may be counterproductive for a computing device to notify applications of a quality of communications of a purportedly sub-optimal base station, because that base station may provide acceptable communication capabilities and the network may be configured to migrate communications to other base stations if the need arises. Indeed, application programs may be conservative in decisions that they make based on network quality based on the assumption that the network quality could drop below a current quality level.

For example, a music streaming application program may receive an indication that the current signal quality level is three-of-five bars, and may decide to stream music at a lower bitrate than it otherwise would have if the signal quality had been four-of-five bars, because the three-bar connection may be more prone to drop to a two-bar connection than if the network connection were four or five bars. But, the music streaming application program may be over conservative in its decision, because the network provider may not permit the connection between the computing device and the network to drop to a two-bar level for any extended period of time.

Similarly, a user of the computing device may see that his or her device is communicating with the wireless network at a level of three bars, and may incorrectly assume that the wireless network cannot provide a satisfactory level of service. In fact it is the opposite in many situations—the wireless network has an over-abundance of base stations and resources and has elected to have the computing device stay with a base station that may not provide the most powerful signal because current demands by the computing device may not merit the most powerful signal at the moment.

In such situations, the computing device may notify application programs (e.g., programs and device services) that the computing device is communicating with the wireless network at a quality level that is different than that of the base station at which the computing device is currently camped (e.g., the base station that provides over 80%, 90%, or 95% of data over a recent 5, 10, or 30 second time period). The quality level indicated to application programs may be a highest-quality level monitored among all base stations that a computing device is authorized to access at a given moment.

An application program may receive, from the operating system of the computing device, an indication of network quality and may use that information to request a certain quality level of a file (e.g., a certain bitrate or resolution of a media file), or may use the information to schedule communications (e.g., to transmit files immediately rather than waiting until the network quality improves).

Moreover, the computing device may indicate to a user that a current quality of wireless communications equals that of a second base station that provides higher-quality communications with respect to a first base station at which the computing device is currently camped. This indication can involve providing a signal quality icon in a status bar of the computing device that displays a quality of communications received from the second base station (e.g., three bars or 80 db) rather than a quality of communications received from the first base station (e.g., two bars or 50 db). The status bar may be a portion of the display at which the computing device displays a horizontal arrangement of icons that identify at least wireless signal quality, battery capacity or charging status, and time of day. The status bar may display at a top of the display and may display persistently even as the user requests that the computing device switch from one application program to another application program.

The number of bars displayed by the signal quality icon need not be discrete bars. In some examples, the bars are displayed adjacent to each other without gaps. As such, the indication of signal quality is sometimes referred to as a fuel gauge that displays differing amounts of the icon as being full based on a quality of the connection. The signal quality icon can comprise a number in some examples.

In some examples, the signal quality icon represents the qualities of communications with multiple base stations. For example, the signal quality icon may show a quality of communication with a first base station in a first manner (e.g., a first color or pattern) concurrently with showing a quality of communications with a second base station in a second manner (e.g., a second color or pattern). The indication of the quality of communications with the second base station may be represented by a combination of the indication of the quality of communications with the first base station and an additional portion (e.g., a second portion of the icon may be stacked next to a portion of the icon that represents a quality of communications with the first base station, so that the combination of both portions represents a quality of communications with the second base station).

In some examples, the computing device may connect to the wireless network through a single base station at a time, in a traditional manner. In such circumstances, the computing device receives its control signals and substantive data communications (e.g., data retrieved from the Internet) from that single base station. The computing device may communicate with other base stations at the same time, but those communications may be limited to determining the presence and power level (or other measure(s) of signal quality) of transmissions from those other base stations, for example, to help determine whether the computing device should switch to another base station. In other words, the computing device may not have handed-off communications to these other base stations and may only communicate limited information with such base stations. As such, if the computing device sent a request for a web page at a specific Universal Resource Locator (URL) as a result of user interaction with a web browser that types the URL or clicks a link to the URL within a page presented by the web browser, that request would be sent through the main base station (sometimes referred to as a camped base station) rather than the other base stations. This may be even if the computing device has identified that signals received from one or more of the other base stations are of a higher quality than signals received from the main base station.

In other examples, the computing device may communicate with multiple base stations as part of a carrier aggregation mechanism. In such a mechanism, the computing device may first connect to a primary base station, and the network provider may send a request, to the computing device through the primary base station, that the computing device scan certain portions of wireless spectrum to determine a presence of other base stations from which the computing device can receive signals. The computing device may perform the scan and return back to the primary base station information that identifies one or more other base stations and a quality of signals received from those one or more other base stations. Computing systems that control network operation may send to the computing device, through the primary base station, instructions to connect to one of the base stations that the computing device identified during the scan. As a result, the computing device may connect to this secondary base station.

The secondary base station may not be able to transmit signals as far as the primary base station, for example, due to the secondary base station sending communications over higher frequencies than the primary base station. The higher frequencies, however, may allow the secondary base station to communicate more information over a given period of time. Moreover, because the secondary base station may serve a smaller geographical area, the secondary base station may be able to devote more of its wireless resources to data transfers with the computing device.

Still, the secondary base station may not transmit any or most network-level control signals to the computing device. Rather, the primary base station may remain responsible for sending such information. For example, the primary base station may remain exclusively responsible for sending attach commands, registration commands, and paging commands. Paging commands may be those commands that inform the computing device of an incoming telephone voice call or an incoming SMS text message. The primary base station may participate in substantial data transfers with the computing device, for example, of media files that the computing device requested from an Internet URL, but the wireless networking system may decide to send, to the computing device using the primary base station, a request that the computing device request such information from the secondary base station rather than the primary base station. In some examples, the wireless network system may receive a data request from a computing device through the primary base station and may elect to respond to the computing device through the secondary base station exclusively.

In such examples, the quality of the communication with the secondary base station may be higher than that of the primary base station, and the computing device can elect to provide an indication of the quality level of the secondary base station instead of or in addition to providing an indication of the quality level of the primary base station, in any of the various manners already described throughout this disclosure (e.g., by providing a quality of only the secondary base station to other applications, or as part of an signal quality icon in the status bar of the display).

In some examples, once a computing device has determined that there exists a second base station that provides higher quality communications with respect to a main base station with which the computing device is currently communicating (e.g., a base station at which the computing device is camped or a primary base station in a carrier aggregation implementation), the computing device remains connected to the main base station but increases a frequency with which the computing device monitors a quality level of communications received from the second base station.

Increasing the frequency at which the computing device monitors the quality level of communications received from the second base station can include sending more frequent requests to the second base station in order to receive replies and evaluate the quality of the replies. In some examples, the computing device may not send requests to the second base station (i.e. the computing device is passive with regard the second base station), but a system of the computing device may check the quality of signals received from the second base station more frequently and may compare the quality of those signals to the quality of signals received from the main base station more frequently than if the computing device were not receiving such high-quality signals from the second base station.

The frequency with which the computing device monitors the quality of signals from the second base station may be the same as a frequency at which the computing device monitors the quality of signals from the main base station. Both frequencies may, whether the same or different, be higher than a frequency at which the computing device monitors the quality of signals received from other base stations that the computing device has not specially designated for increased attention.

In circumstances in which the computing device determines that a quality of communications received from the main base station has increased with respect to the second base station and now exceed the quality of communications received from second base station, the computing device may switch from providing applications with information that identifies the quality of the second base station to providing applications with information that identifies the quality of the main base station, and may show a quality of communications received from the main base station on a display of the computing device (e.g., with a status quality icon in the status bar).

The remainder of this disclosure provides additional detail regarding the mechanisms introduced above with respect to various figures. The description will generally follow the flowchart of FIGS. 1A-1D, which describes a process for providing signal quality information for a non-primary base station. The description of that flowchart will reference FIGS. 2, 3, and 4, to illustrate various aspects of the signal quality providing techniques.

Figure 2:
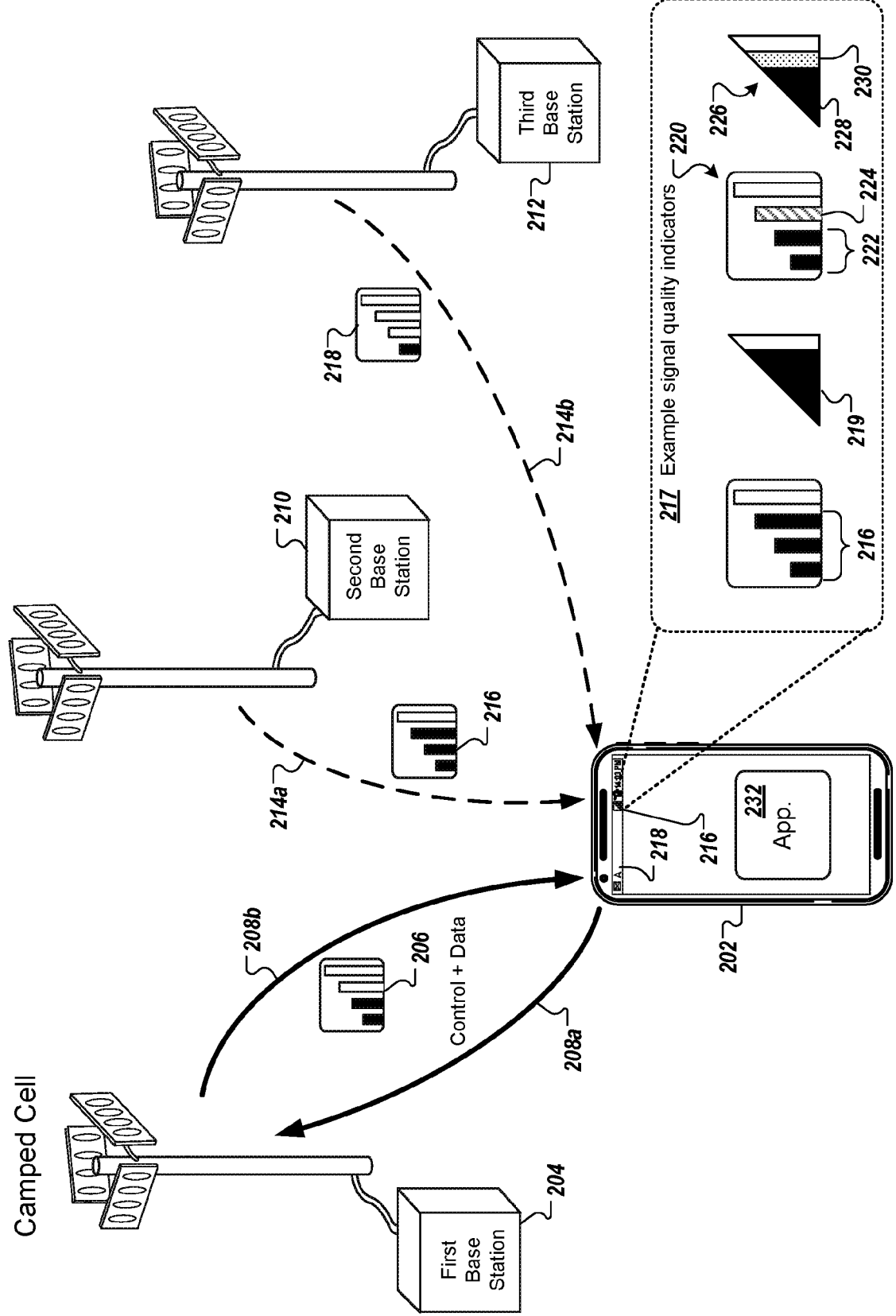
FIGS. 2-4 are conceptual diagrams of systems for providing signal quality information for non-primary base stations.

Referring now to the flowchart that begins in FIG. 1A, at box 102 a computing device identifies a first quality of wireless communication between a first base station and the computing device based on wireless signals that the computing device received from the first base station. For instance, a computing device 202 that is depicted in FIG. 2 as a smartphone may identify a first quality of wireless communication between the computing device 202 and a first base station 204. The first quality of wireless communication is represented by a quality symbol 206 that indicates a signal strength of two bars.

A quality of wireless communication can be measured in various ways. A wireless communication quality value can indicate or take into account signal strength, packet loss ratio, signal-to-noise ratio, power, or a combination of such factors.

The computing device 202 can communicate, at a given point in time, with one or more cellular networks that may include multiple geographically dispersed cell towers with which the computing device 202 can communicate when at a given location. The computing device 202 may currently be sending and receiving control signals and substantive data communications to/from the first base station 204 (e.g., as illustrated by solid-line data flow arrows 208a and 208b). The first base station 204 may thus be referred to as a "camped cell". The computing device 202 may communicate with other base stations at the same time, including a second base station 210 and a third base station 212, but those communications may be limited to determining the presence and power level of transmissions from those other base stations (e.g., as illustrated by dashed-line status data flow arrows 214a and 214b, respectively).

At box 104, the computing device identifies, while remaining in wireless communication with the first base station, a second quality of wireless communication between a second base station and the computing device based on wireless signals that the computing device received from the second base station. For instance, the computing device 202 may identify a second quality of wireless communication between the computing device 202 and the second base station 210. The second quality of wireless communication is represented by a quality symbol 216 that indicates a signal strength of three bars. The computing device 202 can identify other qualities of wireless communication between other base stations and the computing device 202 (e.g., the computing device 202 can identify a third quality of wireless communication, represented by a quality symbol 218, between the computing device 202 and the third base station 212).

At box 106, the computing device determines that the second quality of wireless communication between the second base station and the computing device is better than the first quality of wireless communication between the first base station and the computing device. For example, the computing device 202 can determine that the three-bar level quality of wireless communication between the computing device 202 and the second base station 210 is better than the two-bar level quality of wireless communication between the computing device 202 and the first base station 204. The computing device 202 can periodically (e.g., once every five seconds) compare a quality of wireless communication of a base station to which the computing device 202 is currently connected to qualities of wireless communication of other base stations to which the computing device 202 is capable of connecting. A given wireless communication quality may be deemed better than another wireless communication quality due to a higher signal strength, a higher signal-to-noise ratio, a lower packet-loss ratio, or a combination of factors.

At box 120, the computing device continues to wirelessly communicate with the first base station after having determined that the second quality of wireless communication is better than the first quality of wireless communication, as a result of one or more instructions received by the computing device from the first base station. For instance, the computing device 202 can continue to wirelessly communicate with the first base station 204 after having determined that the three-bar quality for the second base station 210 is greater than the two-bar quality for the first base station 204. The computing device 202 may continue to wirelessly communicate with the first base station 204 because the first base station 204 may currently be providing sufficient throughput for voice and data communications requested by the computing device 202.

The computing device may continue to wirelessly communicate with the first base station in response to network management instructions received from the first base station or another base station (box 122). For example, the computing device 202 may have received instructions indicating that the computing device 202 is to remain connected to the first base station 204 due to congestion at the second base station 210. The second base station 210 may be experiencing overuse and the computing device 202 (and other computing devices) can receive instructions (e.g., from the second base station 210, the first base station 204, or from another source) to connect to, or stay connected to, other nearby base stations other than the second base station 210, even if those other base stations offer lower quality connections than offered by the second base station 210.

Network management instructions can include other instructions relating to distributing computing devices across base stations. For example, the network provider may desire to obtain a balanced distribution of computing devices to base stations, and the first base station 204 may determine that its allotment of computing devices is lower than other nearby base stations, including the second base station 210. Accordingly, the first base station 204 (or another source) may instruct the computing device 202 to remain connected to the first base station 204 as long as the first base station 204 can provide an acceptable wireless communication quality for the computing device 202, rather than switching to a nearby base station, such as the second base station 210, that has a higher quality.

The computing device (or the network provider) may reserve a base station with a highest quality signal (or with a signal having a quality higher than a predefined quality threshold) for certain types of communications, such as transfer of video data. For instance, the computing device 202 may receive information from the second base station 210 (or from another source) that indicates that the second base station 210 is reserved for certain types of communication. The computing device 202 can determine that the computing device 202 is currently not in need of a certain type of communication reserved for the second base station 210, and thereby may determine to not switch to the second base station 210, even though the second base station 210 has a higher quality signal than the first base station 204.

The computing device can implement hysteresis (box 124) to avoid switching back and forth between multiple base stations too frequently. The computing device 202 may have implemented a time delay after having last switched to the first base station 204, for example. The computing device 202 may have determined that the second base station 210 has a higher quality than the first base station 204 before a triggering of the time delay. The computing device 202 may be configured to remain connected to the first base station 204 for at least a certain amount of time to ensure that the computing device 202 does not switch base stations too frequently. Hysteresis can increase network stability and reduce resource consumption by preventing unnecessary movement of the computing device 202 from cell-to-cell within the cellular network. Without hysteresis, the computing device 202 may switch between base stations many times within a short time period, for example, if signal qualities of one or more base stations are fluctuating.

When the computing device continues to wirelessly communicate with the first base station after having determined that the second quality of wireless communication is better than the first quality of wireless communication, the computing device can send communications to remote computing systems over the Internet exclusively through the first base station without sending communications to remote computing systems over the Internet through the second base station (box 126). Alternatively, the computing device can send communications to remote computing systems over the Internet at least partially through the second base station (box 128).

For example, the computing device can send communications to remote computing systems over the Internet at least partially through the second base station while receiving control signals from the first base station (box 130). The computing device can receive, for example, paging signals, attach commands, registration commands, and other control signals exclusively from the first base station and not from the second base station while the computing device concurrently communicates with the first base station and the second base station. The computing device can receive media content transmitted over the Internet from the second base station while the computing device concurrently communicates with the first base station and the second base station, for example.

Figure 3:
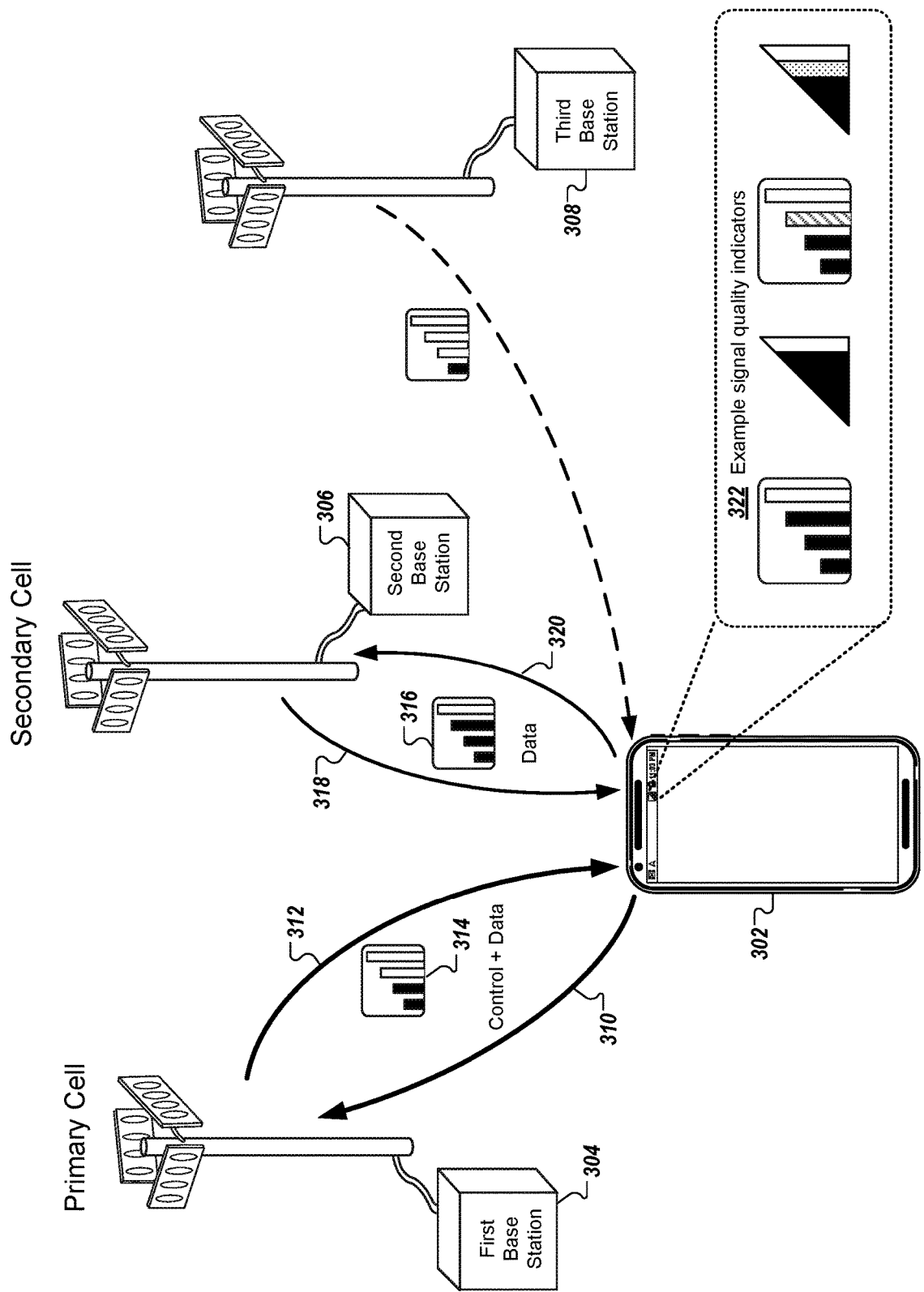

The computing device can communicate with multiple base stations during a same time period according to a carrier aggregation mechanism (box 132). For instance, a computing device 302 that is depicted in FIG. 3 as a smartphone can communicate with both a first base station 304 and a second base station 306 in a same time period. The first base station 304 can be a primary cell for the carrier aggregation mechanism and the second base station 306 can be a secondary cell for the carrier aggregation mechanism.

The computing device 302 may first connect to the first base station 304 as a primary base station. The network provider may send a request to the computing device 302 through the first base station 304 that the computing device 302 scan certain portions of the wireless spectrum to determine a presence of other base stations from which the computing device 302 can receive signals. The computing device 302 may perform the scan and identify the second base station 306 and a third base station 308 as base stations from which the computing device 302 can receive signals. The computing device 302 can send to the first base station 304 a list of multiple base stations, including the second base station 306 and the third base station 308, from which the computing device 302 receives wireless signals. The list can include a quality of signals received from the multiple base stations. The computing device 302 can receive instructions, from the first base station 304 or from another computing system that controls network operation, to wirelessly connect to the second base station 306 while remaining connected to the first base station 304. The computing device 302 can establish wireless communication with the second base station 306 in response to having received the instructions.

The second base station 306 may not transmit any or most network-level control signals to the computing device 302. Rather, the first base station 304 may remain responsible for sending such information. The first base station 304 may participate in substantial data transfers with the computing device 302, along with control messages, as illustrated by solid data/control flow arrows 310 and 312. However, the wireless network system may decide to send, to the computing device 302 using the first base station 304, a request that the computing device 302 request data from the second base station 306 rather than the first base station 304, based at least in part on a first quality of wireless communication associated with the first base station 304 (illustrated by a quality symbol 314) being worse than a second quality of wireless communication associated with the second base station 306 (illustrated by a quality symbol 316). Accordingly, the computing device 302 may participate in data transfer with the second base station 306, as illustrated by solid data flow arrows 318 and 320.

The computing device can communicate with the second base station over a higher frequency and/or with a higher power than with the first base station (box 134). For example, the computing device 302 can communicate with the second base station 306 over a second frequency range that is higher than a first frequency range over which the computing device 302 communicates with the first base station 304. As another example, signals transmitted by the second base station 306 for receipt by the computing device 302 (e.g., corresponding to data flow arrow 318) can be transmitted with a second power level that is lower than a first power level used for signals transmitted by the first base station 304 for receipt by the computing device 302 (e.g., corresponding to the data flow arrow 312).

The computing device 302 can be simultaneously connected to multiple secondary base stations, as well as to a primary base station. For instance, the computing device 302 can be connected to the first base station 304 as a primary base station and to the second base station 306 and the third base station 308 as secondary base stations. The computing device 302 can be simultaneously connected to different base stations that use different technologies. For example, the computing device 302 may be connected to the first base station as a primary base station that uses 4G technology and to the second base station 306 and the third base station 308 as secondary base stations that use 4G and 5G technology, respectively. When connected to multiple secondary base stations, the computing device 302 can determine that one or more of the secondary base stations has a quality of wireless communication with the computing device 302 that is better than a quality with the primary base station. The computing device 302 can determine which of the multiple secondary base stations (e.g., the second base station 306) has the best quality of wireless communication with the computing device 302.

At box 140, the computing device provides, while continuing to wirelessly communicate with the first base station, an indication that wireless communication with the computing device has the second quality of wireless communication. The second quality may represent current capabilities of the wireless communication network to which the computing device is connected rather than a specific base station to which the computing device is momentarily connected. In a carrier aggregation scenario, the second quality can reflect the quality of the wireless connection between the computing device and a secondary base station that is handling a majority of the data transfer, even though the computing device is receiving control signals from a different, primary base station.

Providing the indication can include presenting, by a display of the computing device, an indication that wireless communication with the computing device has the second quality (box 142). The displayed indication that wireless communication with the computing device has the second quality can be presented in a status bar of a display of the computing device (box 144). For example, an indicator 216, shown in example signal quality indicators 217, can be displayed in a status bar 218 of the computing device 202, along with other information, such as a displayed indication of battery capacity of the computing device 202, a displayed indication of time of day, and other information. The indicator 216 can display a quality of communications received from the second base station 210 (e.g., three bars) rather than a quality of communications received from the first base station 204 (e.g., two bars). The computing device 202 may be the device that determines the quality of communications received from a base station.

Although the indicator 216 displays a number (e.g., three) of filled-in bars, other indicators can be used, such as a number or a percentage. As another example, a fuel gauge indicator 219 can indicate the second quality. The fuel gauge indicator 219 can illustrate the display of a certain number of bars that are displayed adjacent to each other without gaps (e.g., as an alternative to the display of discrete bars in the indicator 216). The fuel gauge indicator 219 can display differing amounts of an icon as being full, based on the second quality.

The computing device can present the indication that wireless communication with the computing device has the second quality as an only presented indication of a quality of wireless communication with the computing device (box 146). As another example, the computing device can present the indication that wireless communication with the computing device has the second quality along with presenting another indication that indicates the first quality of wireless communication (box 148). For instance, the displayed indication in the status bar that wireless communication with the computing device has the second quality can be a presentation of certain number of bars (e.g., three) representing signal strength with the second base station. The certain number of bars can be presented in the status bar along with a presentation of a different number of bars (e.g., two) representing signal strength of the first quality of wireless communication, with the different number of bars being less than the certain number of bars.

For instance, a signal quality indicator 220 can be displayed in the status bar 218. The signal quality indicator 220 includes two bars 222 that have a first style (e.g., solid bars). The two bars 222 can illustrate the first quality of wireless communication with the first base station 204. The signal quality indicator 220 includes a third bar 224 that has a second style (e.g., dashed bar) that is different than the first style. The styling of the third bar 224 with the second style can indicate the second quality of wireless communication, and the height of the third bar 224 being greater than the height of the two bars 222 indicates that the second quality is higher than the first quality. The second quality can be represented by the combination of the two bars 222 and the third bar 224.

In some examples, the presentation of the first number of bars includes a presentation of a first contiguous portion of a graphical object and the presentation of the second number of bars includes a presentation of a second contiguous portion of the graphical object that includes the first contiguous portion and an additional portion of the graphical object. For instance, a fuel gauge indicator 226 includes a first contiguous portion 228 that represents the first quality of wireless communication. The fuel gauge indicator 226 includes a second contiguous portion, that represents the second quality, which includes the first contiguous portion 228 and an additional portion 230. The additional portion 230 indicates a difference in quality level between the first quality and the second quality. Although presenting information regarding two qualities of wireless communication have been described above in various examples, information for more than two qualities can be presented.

The indicators included in the example signal quality indicators 217 can also be shown in a carrier aggregation scenario (e.g., as one or more of example signal quality indicators 322 in FIG. 3). In a carrier aggregation scenario, a signal quality indicator can present information that reflects the quality of the wireless connection between the computing device 302 and a secondary base station (e.g., the second base station 306) that is handling a majority of the data transfer, even though the computing device 302 is receiving control signals from a different, primary base station (e.g., the first base station 304).

Providing the indication of the second quality can include providing the indication of the second quality to a first or third party application program that is executing on the computing device, e.g. that was downloaded from an online application marketplace, or included in an operating system installation or upgrade (box 150). The computing device can provide, to the application program, the indication that wireless communication with the computing device has the second quality, without providing any indication to the application program that wireless communication with the computing device has the first quality (box 152).

For example, the computing device 202 can provide the indication of the second quality of wireless communication to an application 232 running on the computing device 202. The second quality level may be a highest-quality level monitored among all base stations that the computing device 202 is authorized to access, and providing the second quality level to the application 232 rather than the first quality may more accurately reflect the capabilities of the wireless network.

The application program can select to receive media content at a second quality level that is higher than a first quality level in response to the application program having received the indication that wireless communication by the computing device has the second quality (box 154). For example, the application 232 can be a music streaming application and can, in response to receiving the indication that wireless communication by the computing device 202 has the second quality, select to stream music at a higher bitrate than if the application 232 received an indication that wireless communication by the computing device 202 was limited to the first quality.

At box 160, the computing device monitors signal quality of base stations at various frequencies. For example, at box 162, the computing device designates, based on the computing device having determined that the second quality of wireless communication is better than the first quality of wireless communication, the second base station as a base station for which to monitor signal quality more frequently than other base stations that are not so designated.

Figure 4:
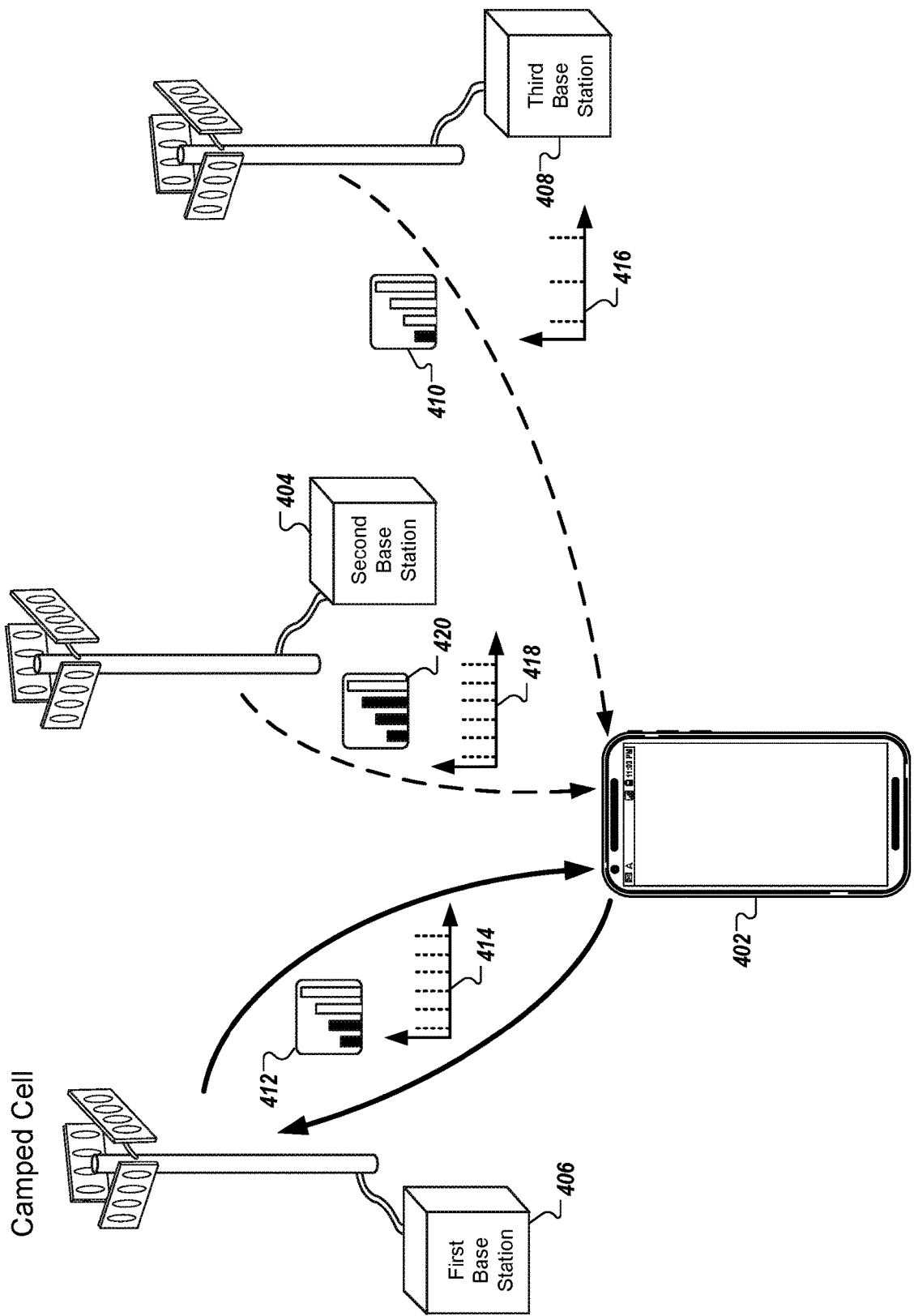

For instance, a computing device 402 that is depicted in FIG. 4 as a smartphone can, based on determining that a second quality of wireless communication between the computing device 402 and a second base station 404 is better than a first quality of wireless communication between the computing device 402 and a first base station 406, determine to monitor signal quality of the second base station 404 more frequently than for a third base station 408.

More particularly, at box 164, the computing device can monitor higher-quality base stations more frequently than lower-quality base stations. For example, at box 166, the computing device identifies, while continuing to wirelessly communicate with the first base station, a third quality of wireless communication between a third base station and the computing device based on wireless signals that the computing device received from the third base station. For instance, the computing device 402 can identify, while wirelessly communicating with the first base station 406, a third quality of wireless communication between the third base station 408 and the computing device 402.

At box 168, the computing device determines that the third quality of wireless communication is worse than the first quality of wireless communication between the first base station and the computing device. For instance, the computing device 402 can determine that the third quality of wireless communication for the third base station 408 (illustrated as a one-bar quality symbol 410) is worse than the first quality of wireless communication for the first base station 406 (illustrated as a two-bar quality symbol 412).

At box 170, the computing device monitors a quality of wireless communications between the first base station and the computing device at a first frequency. For instance, the computing device 402 can monitor a quality of wireless communications between the first base station 406 and the computing device 402 at a frequency illustrated by a first frequency symbol 414. The first frequency can be a frequency at which to monitor a base station to which the computing device 402 is currently connected.

At box 172, the computing device monitors a quality of wireless communications between the third base station and the computing device at a third frequency that is less than the first frequency, as a result of the computing device having determined that the third quality of wireless communication is worse than the first quality of wireless communication. For instance, the computing device 402 can monitor a quality of wireless communications between the third base station 408 and the computing device 402 at a frequency illustrated by a third frequency symbol 416. The third frequency symbol 416 illustrates, when compared to the first frequency symbol 414, that the third frequency is less than the first frequency. The third frequency can be a frequency at which to monitor a base station which has a last-monitored quality that is less than a quality of the base station to which the computing device 402 is currently connected.

At box 174, the computing device monitors a quality of wireless communications between the second base station and the computing device at a second frequency that is greater than the third frequency, as a result of the computing device having determined that the second quality of wireless communication is better than the first quality of wireless communication. For instance, the computing device 402 can monitor a quality of wireless communications between the second base station 404 and the computing device 402 at a frequency illustrated by a second frequency symbol 418, based on the computing device 402 having determined that a second quality of wireless communication (illustrated as a three-bar quality symbol 420) is greater than the first quality illustrated by the quality symbol 412. The second frequency symbol 418 illustrates, when compared to the third frequency symbol 416, that the second frequency is greater than the third frequency. The second frequency can be the same as or different than the first frequency.

Figure 5:
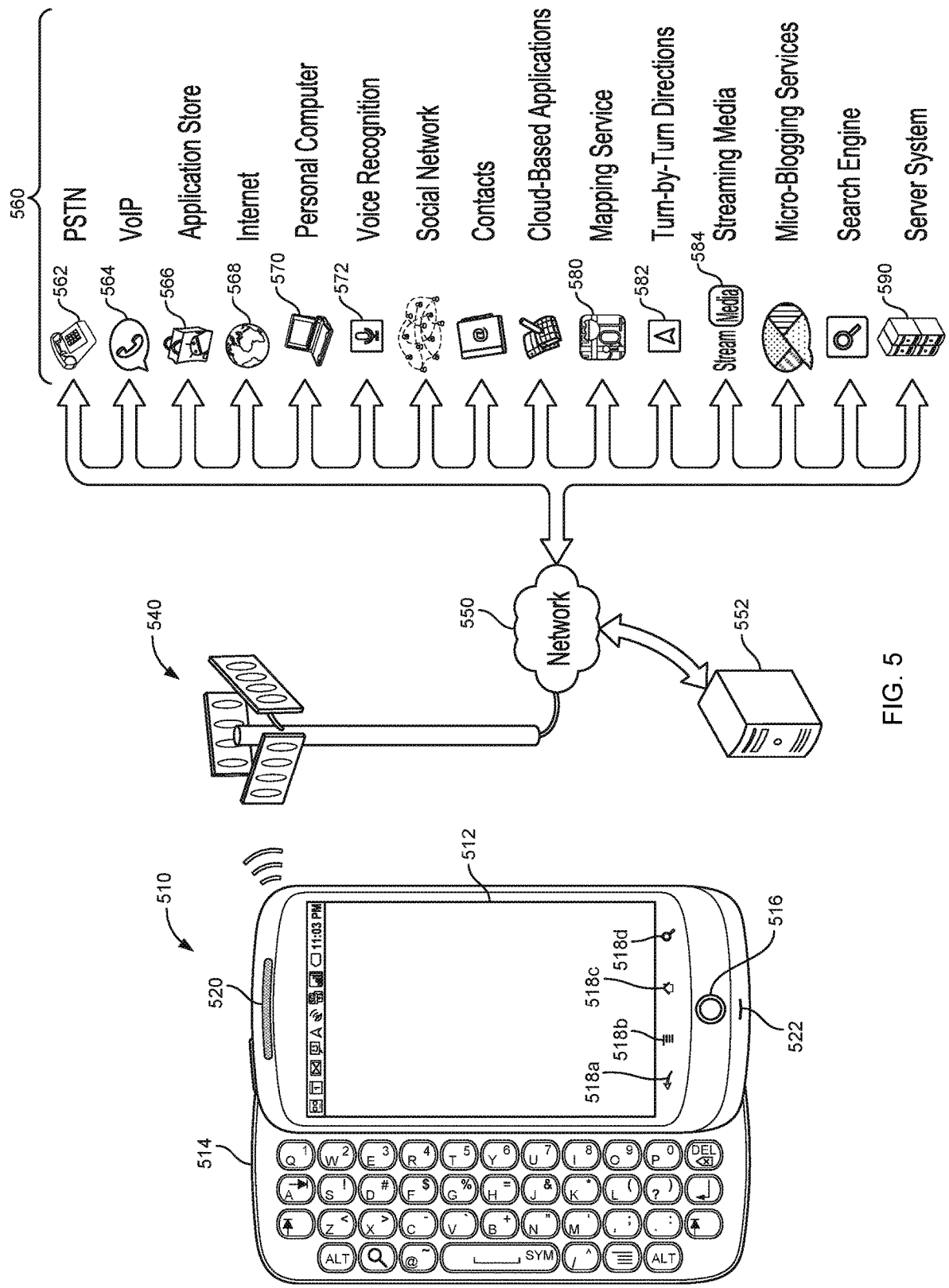
FIG. 5 is a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs and/or presence-sensitive user input (e.g., as detected using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
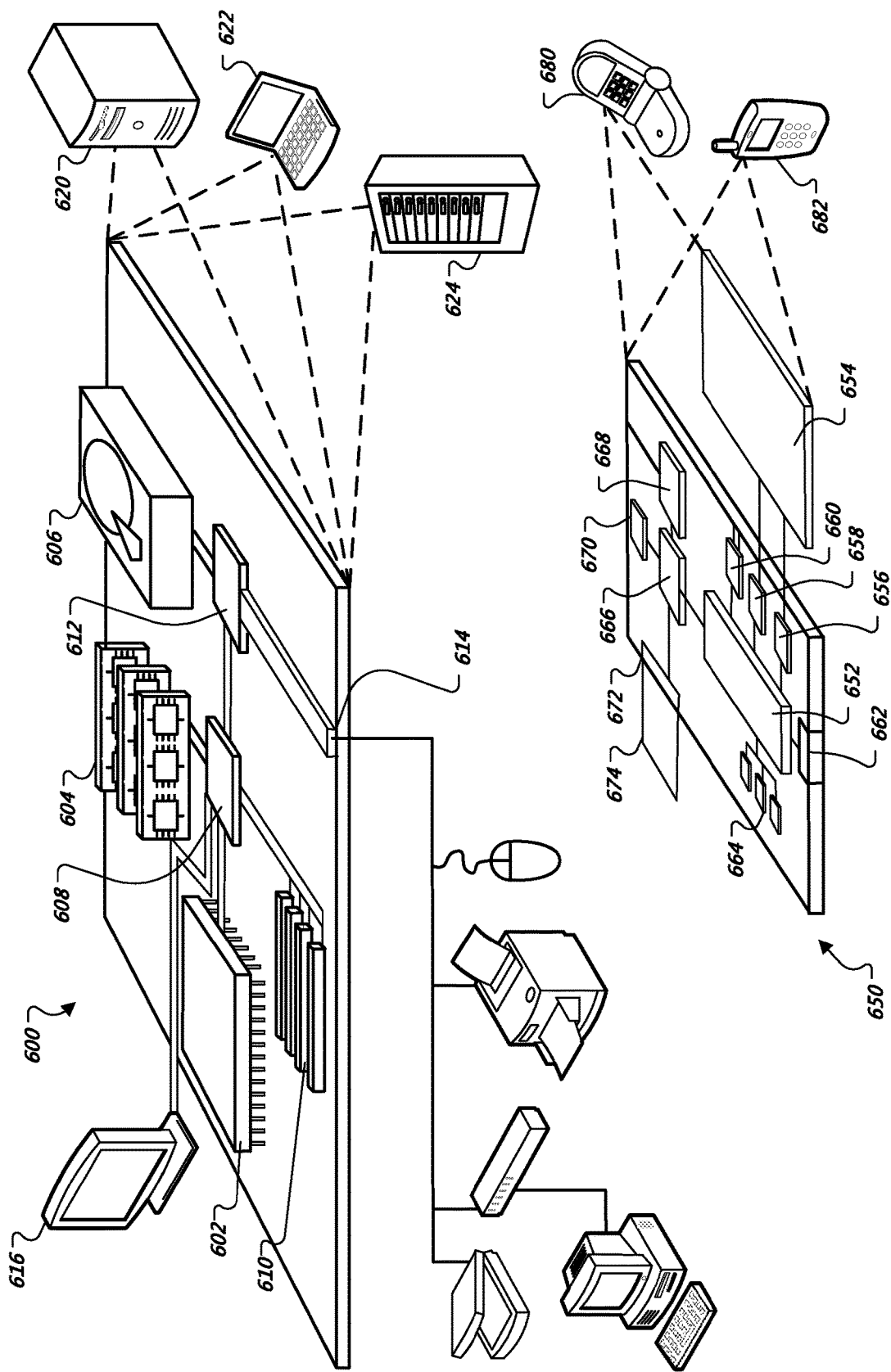
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications.

The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   identifying, by a computing device, a first quality of wireless communication between a first base station and the computing device based on wireless signals that the computing device received from the first base station;
   identifying, by the computing device while the computing device remains in wireless communication with the first base station, a second quality of wireless communication between a second base station and the computing device based on wireless signals that the computing device received from the second base station;
   determining, by the computing device, that the second quality of wireless communication between the second base station and the computing device is better than the first quality of wireless communication between the first base station and the computing device;
   continuing, by the computing device, to wirelessly communicate with the first base station after having determined that the second quality of wireless communication is better than the first quality of wireless communication, as a result of one or more instructions received by the computing device from the first base station; and
   providing, by the computing device while the computing device continues to wirelessly communicate with the first base station, an indication that wireless communication with the computing device has the second quality of wireless communication,
   wherein providing the indication that wireless communication with the computing device has the second quality includes presenting, in a status bar of a display of the computing device, a displayed indication that wireless communication with the computing device has the second quality, wherein, when presenting the displayed indication that wireless communication with the computing device has the second quality, the second quality is the only one of the first and second qualities that is indicated in the status bar of the display of the computing device.

2. The computer-implemented method of claim 1, wherein:
   the displayed indication in the status bar that wireless communication with the computing device has the second quality comprises a presentation of a number of bars representing signal strength.

3. The computer-implemented method of claim 1, wherein providing the indication that wireless communication with the computing device has the second quality further includes providing, to a third-party application program that is executing on the computing device that was downloaded from an online application marketplace independent of an operating system installation or upgrade, the indication that wireless communication with the computing device has the second quality while the computing device continues to wirelessly communicate with the first base station.

4. The computer-implemented method of claim 3, wherein the computing device provides, to the third-party application program, the indication that wireless communication with the computing device has the second quality, without providing any indication to the third-party application program that wireless communication with the computing device has the first quality.

5. The computer-implemented method of claim 3, wherein:
the third-party application program selects to receive media content at a second quality level that is higher than a first quality level in response to the third-party application program having received the indication that wireless communication by the computing device has the second quality; and
the third-party application program is configured to select to receive the media content at the first quality level in response to the third-party application program receiving an indication that wireless communication by the computing device has the first quality.

6. The computer-implemented method of claim 1, wherein continuing to wirelessly communicate with the first base station after having determined that the second quality of wireless communication is better than the first quality of wireless communication includes the computing device sending communications to remote computing systems over the Internet exclusively through the first base station without sending communications to remote computing systems over the Internet through the second base station.

7. The computer-implemented method of claim 1, wherein continuing to wirelessly communicate with the first base station after having determined that the second quality of wireless communication is better than the first quality of wireless communication includes the computing device sending communications to remote computing systems over the Internet at least partially through the second base station while receiving control signals from the first base station.

8. The computer-implemented method of claim 7, wherein:
the computing device communicates with multiple base stations during a same time period according to a carrier aggregation mechanism; and
the first base station comprises a primary cell of the carrier aggregation mechanism; and
the second base station comprises a secondary cell of the carrier aggregation mechanism.

9. The computer-implemented method of claim 7, wherein:
the computing device communicates with the second base station over a second frequency range that is higher than a first frequency range;
the computing device communicates with the first base station over the first frequency range;
signals transmitted by the second base station for receipt by the computing device are transmitted with a second power level that is lower than a first power level; and
signals transmitted by the first base station for receipt by the computing device are transmitted with the first power level.

10. The computer-implemented method of claim 7, further comprising:
sending, by the computing device and to the first base station, a list of multiple base stations from which the computing device receives wireless signals, the list of multiple base stations identifying the second base station;
receiving, by the computing device and from the first base station in response to the computing device having sent the list of multiple base stations to the first base station, one or more instructions to wirelessly connect the computing device to the second base station while the computing device remains connected to the first base station; and
establishing, by the computing device, wireless communication with the second base station in response to the computing device having received the one or more instructions from the first base station.

11. The computer-implemented method of claim 10, further comprising:
receiving, by the computing device, paging signals exclusively from the first base station and not from the second base station while the computing device concurrently communicates with the first base station and the second base station; and
receiving, by the computing device and from the second base station while the computing device concurrently communicates with the first base station and the second base station, media content transmitted over the Internet.

12. The computer-implemented method of claim 1, further comprising:
designating, by the computing device and based on the computing device having determined that the second quality of wireless communication is better than the first quality of wireless communication, the second base station as a base station for which to monitor signal quality more frequently than other base stations that are not so designated.

13. The computer-implemented method of claim 1, further comprising:
identifying, by the computing device while the computing device continues to wirelessly communicate with the first base station, a third quality of wireless communication between a third base station and the computing device based on wireless signals that the computing device received from the third base station;
determining, by the computing device, that the third quality of wireless communication is worse than the first quality of wireless communication between the first base station and the computing device;
monitoring, by the computing device, a quality of wireless communications between the first base station and the computing device at a first frequency;
monitoring, by the computing device, a quality of wireless communications between the third base station and the computing device at a third frequency that is less than the first frequency, as a result of the computing device having determined that the third quality of wireless communication is worse than the first quality of wireless communication; and
monitoring, by the computing device, a quality of wireless communications between the second base station and the computing device at a second frequency that is greater than the third frequency, as a result of the computing device having determined that the second quality of wireless communication is better than the first quality of wireless communication.

14. The computer-implemented method of claim 13, wherein the second frequency is same as the first frequency.

15. A computing system, comprising:
one or more processors; and
one or more computer-readable devices including instructions that, when executed by the one or more processors, cause performance of operations that include:
- identifying, by a computing device, a first quality of wireless communication between a first base station and the computing device based on wireless signals that the computing device received from the first base station;
- identifying, by the computing device while the computing device remains in wireless communication with the first base station, a second quality of wireless communication between a second base station and the computing device based on wireless signals that the computing device received from the second base station;
- determining, by the computing device, that the second quality of wireless communication between the second base station and the computing device is better than the first quality of wireless communication between the first base station and the computing device;
- continuing, by the computing device, to wirelessly communicate with the first base station after having determined that the second quality of wireless communication is better than the first quality of wireless communication, as a result of one or more instructions received by the computing device from the first base station; and
- providing, by the computing device while the computing device continues to wirelessly communicate with the first base station, an indication that wireless communication with the computing device has the second quality of wireless communication,
- wherein providing the indication that wireless communication with the computing device has the second quality includes presenting, in a status bar of a display of the computing device, a displayed indication that wireless communication with the computing device has the second quality, wherein, when presenting the displayed indication that wireless communication with the computing device has the second quality, the second quality is the only one of the first and second qualities that is indicated in the status bar of the display of the computing device.

16. The computing system of claim 15, wherein the displayed indication in the status bar that wireless communication with the computing device has the second quality comprises a presentation of a number of bars representing signal strength.

17. At least one non-transitory computer readable medium having stored thereon instructions executable by one or more processors to cause performance of operations including:
- identifying, by a computing device, a first quality of wireless communication between a first base station and the computing device based on wireless signals that the computing device received from the first base station;
- identifying, by the computing device while the computing device remains in wireless communication with the first base station, a second quality of wireless communication between a second base station and the computing device based on wireless signals that the computing device received from the second base station;
- determining, by the computing device, that the second quality of wireless communication between the second base station and the computing device is better than the first quality of wireless communication between the first base station and the computing device;
- continuing, by the computing device, to wirelessly communicate with the first base station after having determined that the second quality of wireless communication is better than the first quality of wireless communication, as a result of one or more instructions received by the computing device from the first base station; and
- providing, by the computing device while the computing device continues to wirelessly communicate with the first base station, an indication that wireless communication with the computing device has the second quality of wireless communication,
- wherein providing the indication that wireless communication with the computing device has the second quality includes presenting, in a status bar of a display of the computing device, a displayed indication that wireless communication with the computing device has the second quality, wherein, when presenting the displayed indication that wireless communication with the computing device has the second quality, the second quality is the only one of the first and second qualities that is indicated in the status bar of the display of the computing device.

18. The non-transitory computer-readable medium of claim 17, wherein the displayed indication in the status bar that wireless communication with the computing device has the second quality comprises a presentation of a number of bars representing signal strength.

* * * * *